United States Patent
Makimizu et al.

(10) Patent No.: US 9,828,663 B2
(45) Date of Patent: Nov. 28, 2017

(54) GALVANNEALED STEEL SHEET WITH EXCELLENT ANTI-POWDERING PROPERTY

(71) Applicant: JFE STEEL CORPORATION, Chiyoda-ku, Tokyo (JP)

(72) Inventors: Yoichi Makimizu, Fukuyama (JP); Yoshitsugu Suzuki, Fukuyama (JP); Hideki Nagano, Kawasaki (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 121 days.

(21) Appl. No.: 14/408,123

(22) PCT Filed: Jun. 18, 2013

(86) PCT No.: PCT/JP2013/003790
§ 371 (c)(1),
(2) Date: Dec. 15, 2014

(87) PCT Pub. No.: WO2014/002428
PCT Pub. Date: Jan. 3, 2014

(65) Prior Publication Data
US 2015/0184273 A1 Jul. 2, 2015

(30) Foreign Application Priority Data

Jun. 25, 2012 (JP) .................... 2012-141531

(51) Int. Cl.
*B32B 15/00* (2006.01)
*C23C 2/06* (2006.01)
(Continued)

(52) U.S. Cl.
CPC .............. *C23C 2/06* (2013.01); *B32B 15/013* (2013.01); *C21D 1/26* (2013.01); *C21D 8/0478* (2013.01);
(Continued)

(58) Field of Classification Search
None
See application file for complete search history.

(56) References Cited

U.S. PATENT DOCUMENTS 5,049,453 A    9/1991  Suemitsu et al.
6,558,815 B1 * 5/2003  Suzuki ................... C22C 23/02
                                                148/533
(Continued)

FOREIGN PATENT DOCUMENTS

CN       102369305        3/2012
EP     2 112 247 A1      10/2009
(Continued)

OTHER PUBLICATIONS

Chinese Office Action dated Jun. 24, 2016 for Chinese Application No. 201380033876.X, including Concise Statement of Relevance, 9 pages.

(Continued)

*Primary Examiner* — Seth Dumbris
(74) *Attorney, Agent, or Firm* — RatnerPrestia

(57) ABSTRACT

Provided is a galvannealed steel sheet with excellent anti-powdering property when press forming is performed, without controlling the contents of chemical elements in steel which are effective for strengthening a steel sheet, such as Si and P, to be low in order to achieve required material properties and without increasing cost due to, for example, processes being complicated. A galvannealed steel sheet with excellent anti-powdering property has a coated layer taking in grains of a base steel sheet such that the grains constitute 2.0% or more and 15.0% or less of the coated layer in terms of cross section area ratio.

7 Claims, 1 Drawing Sheet

(51) Int. Cl.
*C23C 2/28* (2006.01)
*C21D 9/46* (2006.01)
*C22C 18/00* (2006.01)
*C22C 38/04* (2006.01)
*B32B 15/01* (2006.01)
*C22C 38/02* (2006.01)
*C22C 38/38* (2006.01)
*C21D 8/04* (2006.01)
*C21D 9/48* (2006.01)
*C21D 1/26* (2006.01)
*C23C 2/40* (2006.01)

(52) U.S. Cl.
CPC ............... *C21D 9/46* (2013.01); *C21D 9/48* (2013.01); *C22C 18/00* (2013.01); *C22C 38/02* (2013.01); *C22C 38/04* (2013.01); *C22C 38/38* (2013.01); *C23C 2/28* (2013.01); *C23C 2/40* (2013.01); *C21D 2251/00* (2013.01); *Y10T 428/12799* (2015.01)

(56) References Cited

U.S. PATENT DOCUMENTS

| | | | | |
|---|---|---|---|---|
| 7,695,826 | B2* | 4/2010 | Tanaka | ............... C23C 2/02 148/533 |
| 7,736,449 | B2* | 6/2010 | Takada | ............ C21D 8/0273 148/533 |
| 9,309,586 | B2 | 4/2016 | Fushiwaki | |
| 2003/0168134 | A1 | 9/2003 | Fujibayashi et al. | |
| 2010/0006184 | A1* | 1/2010 | Takeda | ............... C23C 2/02 148/242 |
| 2012/0018060 | A1* | 1/2012 | Fushiwaki | ........... C21D 1/26 148/533 |
| 2012/0100391 | A1* | 4/2012 | Lee | ...................... C23C 2/02 428/659 |

FOREIGN PATENT DOCUMENTS

| | | | | |
|---|---|---|---|---|
| EP | 2 258 887 A1 | 12/2010 | | |
| EP | 2 415 896 A1 | 2/2012 | | |
| JP | 01319661 | 12/1989 | | |
| JP | 02170959 | 7/1990 | | |
| JP | H03197659 A | 8/1991 | | |
| JP | 1046305 | 2/1998 | | |
| JP | 2000144362 | 5/2000 | | |
| JP | 2008231493 | 10/2008 | | |
| WO | WO2010114142 | * | 7/2010 | ............... C23C 2/06 |

OTHER PUBLICATIONS

Supplementary European Search Report for Application No. EP 13 80 9989 dated Feb. 18, 2015.
International Search Report for International Application No. PCT/JP2013/003790 mailed Aug. 27, 2013.
Japanese Office Action for Japanese Application No. 2014-522411, dated Jul. 21, 2015, including Concise Statement of Relevance of Office Action, 3 pages.
European Examination Report for European Application No. 13 809 989.0, dated Sep. 12, 2017, 3 pages.

* cited by examiner

GALVANNEALED STEEL SHEET WITH EXCELLENT ANTI-POWDERING PROPERTY

CROSS REFERENCE TO RELATED APPLICATIONS

This is the U.S. National Phase Application of PCT/JP2013/003790, filed Jun. 18, 2013, which claims priority to Japanese Patent Application No. 2012-141531, filed Jun. 25, 2012, the disclosures of each of these applications being incorporated herein by reference in their entireties for all purposes.

FIELD OF THE INVENTION

The present invention relates to a galvannealed steel sheet, in particular, to a galvannealed steel sheet with excellent anti-powdering property.

BACKGROUND OF THE INVENTION

Nowadays, steel sheets which are subjected to a surface treatment and provided with a rust preventive property, in particular, galvannealed steel sheets with excellent rust preventive property, are used as material steel sheets in the fields of, for example, automobile, domestic electric appliance, and building material industries.

Generally, a galvannealed steel sheet is manufactured by performing recrystallization annealing using an annealing furnace in a CGL (continuous galvanization line) on a steel sheet which is obtained by performing hot rolling and cold rolling on a slab, by performing galvanization on the annealed steel sheet, and by performing a heating treatment on the galvanized steel sheet so as to form an Fe—Zn alloy phase due to the occurrence of an alloying reaction in which Fe in the steel sheet and the Zn in the coated layer are diffused. This Fe—Zn alloy phase is a coating usually consisting of a $\Gamma$ phase, a $\delta_1$ phase, and a $\zeta$ phase. There is a tendency for hardness and a melting point to decrease with decreasing Fe concentration, that is, in the order of a $\Gamma$ phase, a $\delta_1$ phase, and a $\zeta$ phase. Therefore, from the viewpoint of sliding property, it is effective to use a coating having a high Fe concentration with which adhesion is less likely to occur due to its high hardness and high melting point, and thus a galvannealed steel sheet for which press forming performance is important is designed so as to have a rather high Fe concentration in its coating.

However, in the case of a coating having a high Fe concentration, a hard and brittle $\Gamma$ phase tends to be formed in the interface of a coated steel sheet (interface between the coated layer and the steel sheet), and there is a problem in that a phenomenon in which the coating exfoliates from the interface, that is, so-called powdering, tends to occur when the coated steel is subjected to forming. Patent Literature 1 discloses an example of a method for solving this problem in which a second layer of a hard Fe-based alloy is formed on the coated layer by using an electric plating method in order to achieve both a sliding property and an anti-powdering property. However, since a treatment apparatus such as an electric plating apparatus is necessary to use the technique according to Patent Literature 1, the technique is not preferable from the viewpoint of facility design and economic efficiency, and, in addition to that, an effect of fundamentally increasing an anti-powdering property cannot be expected.

On the other hand, Patent Literature 2 discloses an example of a technique for increasing an anti-powdering property in which a heating rate and a cooling rate are controlled when an alloying treatment is performed. However, in order to control a heating rate and a cooling rate, it is necessary to increase facilities, for example, which results in an increase in cost. In addition, in the case of a method according to Patent Literature 3 where Si content and P content in steel are restricted, it is difficult to achieve the required material qualities of a steel sheet such as high strength and high ductility due to the restriction of Si content and P content.

PATENT LITERATURE

PTL 1: Japanese Unexamined Patent Application Publication No. 1-319661
PTL 2: Japanese Unexamined Patent Application Publication No. 2-170959
PTL 3: Japanese Unexamined Patent Application Publication No. 10-46305

SUMMARY OF THE INVENTION

The present invention has been completed in view of the situation described above, and an object of the present invention is to provide a galvannealed steel sheet with excellent anti-powdering property when press forming is performed, without controlling the contents of chemical elements in steel which are effective for strengthening a steel sheet, such as Si and P, to be low in order to achieve required material properties and without increasing cost due to, for example, processes being complicated.

The present inventors diligently conducted investigations regarding the state of a coated layer and anti-powdering property of a galvannealed steel sheet which is manufactured by performing galvanization and by performing a heating treatment for alloying on the galvanized steel sheet, and, as a result, found that there is an increase in anti-powdering property in the case where the grains of a base steel sheet are taken into a coated layer. The present invention has been completed on the basis of this finding, and the subject matter of the present invention includes the following.

[1] A galvannealed steel sheet with excellent anti-powdering property, the steel sheet having a coated layer taking in grains of a base steel sheet such that the grains constitute 2.0% or more and 15.0% or less of the coated layer in terms of cross section area ratio.

[2] The galvannealed steel sheet with excellent anti-powdering property according to item [1], in which the coated layer has an Fe content of 10 mass % or more and 20 mass % or less.

[3] The galvannealed steel sheet with excellent anti-powdering property according to item [1] or [2], in which the coated layer has a coating weight per side of 20 g/m² or more and 120 g/m² or less.

[4] The galvannealed steel sheet with excellent anti-powdering property according to any one of items [1] to [3], in which the steel sheet has a chemical composition containing C: 0.030 mass % or more and 0.200 mass % or less, Si: 0.5 mass % or more and 2.0% mass % or less, Mn: 1.0 mass % or more and 3.0 mass % or less, P: 0.025 mass % or less, S: 0.010 mass % or less, and the balance being Fe and inevitable impurities.

According to the present invention, a galvannealed steel sheet with excellent anti-powdering property can be obtained.

DETAILED DESCRIPTION OF EMBODIMENTS OF THE INVENTION

Embodiments of the present invention will be specifically described hereafter.

Figure 1:
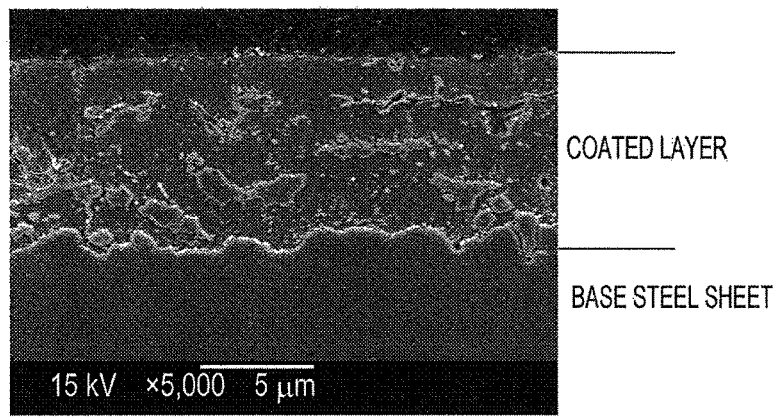
FIG. 1 is a photograph of the cross section of a coated layer.

The present inventors conducted investigations regarding the anti-powdering property of various galvannealed steel sheets, and, as a result, found that, in the case of a steel sheet having only a small Fe content in a coated layer, since only a small amount of a hard and brittle $\Gamma$ phase is formed in the interface of a coated steel sheet, a good anti-powdering property was achieved. Moreover, it was found that not only a steel sheet having only a small Fe content in a coated layer, but also some galvannealed steel sheets having a high Fe content in a coated layer might have a good anti-powdering property. Therefore, by performing cross section observation and elemental analysis using a SEM (scanning electron microscope) and EDS (energy dispersive X-ray spectrometry) on the coated layer of a steel sheet having a good anti-powdering property despite having a high Fe content, it was found that the grains of the base steel sheet were taken into the coated layer as illustrated in FIG. 1.

When bending deformation is applied to a galvannealed steel sheet, a crack caused by compressive deformation in the inside of the bending propagates from the surface of the coated layer into the inside of the coated layer. At this time, in the case where a large amount of a hard and brittle $\Gamma$ phase is formed in the interface between the coated layer and the base steel sheet, the crack reaches some part of the $\Gamma$ phase and the coated layer exfoliates into fragments starting from the reached part. This is called a powdering phenomenon. At this time, it is considered that, in the case where the grains of the base steel sheet are taken into the coated layer, the propagation of the crack in the coated layer is suppressed by the grains of the base steel sheet, and thus it is less likely that the crack will reach a $\Gamma$ phase even if a large amount of a $\Gamma$ phase is formed in the interface between the coated layer and the base steel sheet. Therefore, it is considered that in the case where the grains of the base steel sheet are taken into the coated layer, since the amount of exfoliation of the coated layer due to compressive deformation is decreased, a good anti-powdering property is realized.

Figure 2:
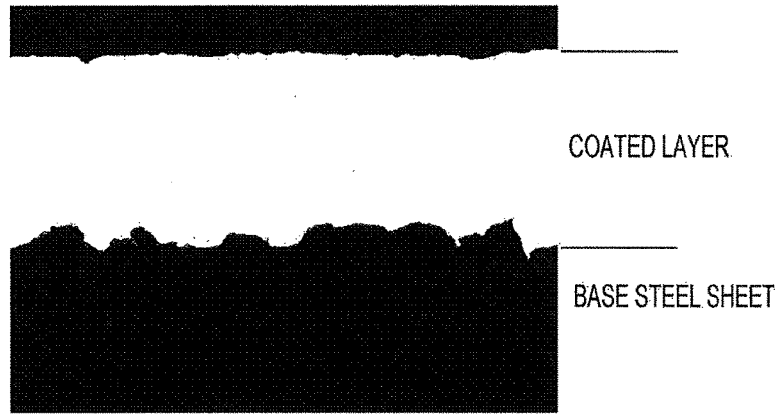
FIG. 2 is a diagram obtained by binarizing the photograph in FIG. 1 in order to derive the cross section area of the coated layer.
Figure 3:
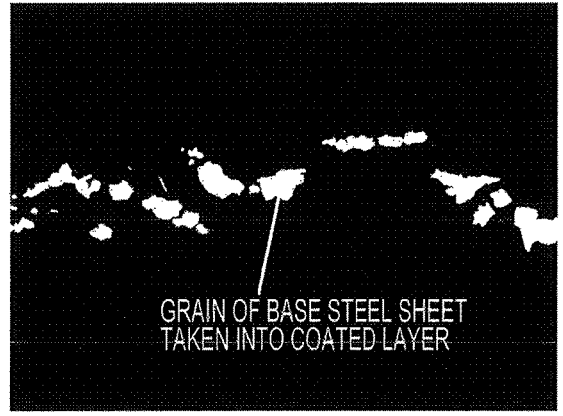
FIG. 3 is a diagram obtained by binarizing the photograph in FIG. 1 in order to derive the cross section area of the grains of the base steel sheet taken into the coated layer.

Moreover, close investigations regarding the amount of the grains of a base steel sheet taken into a coated layer and an effect of increasing anti-powdering property were conducted. It is possible to determine the amount of the grains of the base steel sheet taken into the coated layer by performing cross section observation of the coated layer. FIG. 1 is an example of a SEM image of the cross section of a coated layer taking in the grains of a base steel sheet. By etching a polished cross section using a common method, grains of the base steel sheet can be clearly observed as illustrated in FIG. 1. By binarizing this photograph (by converting the lightness of all the picture elements in this photograph into two values, that is, black and white, on the basis of a specified threshold value) as illustrated in FIG. 2 so as to identify the area of the coated layer in this photograph, the cross section area of the coated layer is derived. Moreover, by performing binarization as illustrated in FIG. 3 so as to identify the grains of the base steel sheet in the coated layer, the cross section area of the grains of the base steel sheet taken into the coated area is derived. By deriving the individual areas, the cross section area ratio of the grains of the base steel sheet with respect to the whole coated layer can be derived. Here, when the coated layer is observed using a SEM, by performing observation using a backscattered electron image, it is possible to clearly distinguish between the coated layer and the grains of the base steel sheet without performing an etching treatment. That is to say, since contrast varies depending on atomic number in a backscattered electron image, it is possible to distinguish between the coated layer part and the base steel sheet part in accordance with difference in the contrast.

From the results of the investigations, according to embodiments of the present invention, the grains of the base steel sheet are taken into a coated layer such that the grains constitute 2.0% or more and 15.0% or less of the layer in terms of cross section area ratio. In the case where the cross section area ratio is less than 2.0%, there is an insufficient effect of suppressing propagation of a crack in the coated layer. Therefore, the effect of increasing an anti-powdering property is insufficient. In addition, in the case where the cross section area ratio is more than 15.0%, the effect becomes saturated, and there is concern that the occurrence of red scale due to the corrosion of the grains of the base steel sheet taken into the coated layer may increase in the case where the steel sheet is used for automobile bodies.

In the case where the grains of the base steel sheet are taken into the coated layer, there is also an inevitable increase in Fe content in the coated layer. Usually, in order to determine Fe content in the coated layer, the coated layer is dissolved using hydrochloric acid containing an inhibitor and Fe content is derived using a method such as ICP (inductively coupled plasma) spectroscopy. In the present invention, in order to increase an anti-powdering property, it is preferable that the Fe content be 10 mass % or more and 20 mass % or less. In the case where the Fe content is less than 10 mass %, since there is an insufficient amount of the grains of the base steel sheet taken into the coated layer, the effect of suppressing propagation of a crack in the coated layer is insufficient, which results in an insufficient effect of increasing an anti-powdering property. In addition, in the case where the Fe content is more than 20 mass %, the effect of increasing an anti-powdering property as a result of the grains of the base steel sheet being taken into the coated layer becomes saturated, and red scale occurs due to the corrosion of the grains of the base steel sheet. In addition to that, since a hard and brittle $\Gamma$ phase formed in the interface of the coated layer and the base steel sheet increases, there is an insufficient effect of increasing an anti-powdering property.

It is preferable, for example, to form internal oxides of, for example, Si and Mn at grain boundaries in the surface layer of a steel sheet in order to take the grains of the base steel sheet into a coated layer. In the case where internal oxides, that is, oxides by internal oxidation, are formed at the grain boundaries in the surface layer of the steel sheet, an Fe—Zn alloying reaction preferentially occurs at the grain boundaries in the subsequent alloying treatment process, which results in the realization of the state in which the grains of the base steel sheet are taken into the coated layer.

In addition, it is preferable that coating weight per side be 20 g/m² or more and 120 g/m² or less. In the case where the coating weight per side is less than 20 g/m², it is difficult to achieve good corrosion resistance. In the case where the coating weight per side is more than 120 g/m², since there is an increase in the amount of a coating exfoliating into fragments when compressive deformation is applied to the coated layer, the effect of increasing an anti-powdering property is insufficient.

Subsequently, the chemical composition of the steel according to embodiments of the present invention will be described. Hereinafter, the contents of the constituent chemical elements of the chemical composition of the steel and the contents of the constituent chemical elements of the chemical composition of the coated layer are expressed in units of "mass %", and "mass %" is simply represented by "%" unless otherwise noted.

Si: 0.5% or more and 2.0% or less

Si is a chemical element which is effective for achieving good material properties as a result of increasing the strength of steel. In the case where the Si content is less than 0.5%, it is difficult to realize the state of a coated layer according to the present invention by utilizing the formation of internal oxides. In addition, in the case where the Si content is more than 2.0%, surface appearance defects such as bare spots and a variation in alloying degree tend to occur when a galvanization treatment is performed. Therefore, it is preferable that the Si content be 0.5% or more and 2.0% or less.

Mn: 1.0% or more and 3.0% or less

Mn is also a chemical element which is effective for increasing the strength of steel. However, in the case where the Mn content is less than 1.0%, it is difficult to take the grains of the base steel sheet into a coated layer by utilizing the formation of internal oxides. In addition, in the case where the Mn content is more than 3.0%, surface appearance defects such as bare spots and a variation in alloying degree tend to occur when a galvanization treatment is performed. Therefore, it is preferable that the Mn content be 1.0% or more and 3.0% or less.

In addition, the chemical elements described below may be added as needed in order to achieve sufficient strength and formability for steel.

C: 0.030% or more and 0.200% or less

C is a chemical element which is necessary to control the microstructure of steel. In the case where the C content is 0.030% or less, it is difficult to achieve the desired strength. In addition, in the case where the C content is more than 0.200%, there is a case where weldability is reduced. Therefore, it is preferable that the C content be 0.030% or more and 0.200% or less.

P: 0.025% or less

P is inevitably contained. In the case where the P content is more than 0.025%, there is a case where weldability is reduced. Therefore, it is preferable that the P content be 0.025% or less.

S: 0.010% or less

S is a chemical element which is inevitably contained. There is no limitation on the lower limit of the S content. However, in the case where the S content is high, there is a case where weldability is reduced, and thus it is preferable that the S content be 0.010% or less.

Note that, in order to control the balance between strength and ductility, one or more chemical elements selected from among Al: 0.01% or more and 0.10% or less, B: 0.001% or more and 0.005% or less, Nb: 0.005% or more and 0.050% or less, Ti: 0.005% or more and 0.050% or less, Cr: 0.05% or more and 1.00% or less, Mo: 0.05% or more and 1.00% or less, Cu: 0.05% or more and 1.00% or less, and Ni: 0.05% or more and 1.00% or less may be added as needed. The reasons for the limitations on the contents will be described hereafter.

In the case where the Al content is less than 0.01%, there is an insufficient effect of deoxidation in a steelmaking process and in the case where the Al content is more than 0.10%, there is a decrease in slab quality.

In the case where the B content is less than 0.001%, it is difficult to realize an effect of increasing hardenability and in the case where the B content is more than 0.005%, there is an increase in cost.

In the case where the Nb content is less than 0.005%, it is difficult to realize an effect of controlling strength and in the case where the Nb content is more than 0.050%, there is an increase in cost.

In the case where the Ti content is less than 0.005%, it is difficult to realize an effect of controlling strength and in the case where the Ti content is more than 0.050%, there is a case where the adhesiveness of coating is reduced.

In the case where the Cr content is less than 0.05%, it is difficult to realize an effect of increasing hardenability and in the case where the Cr content is more than 1.00%, there is a case where formability is reduced.

In the case where the Mo content is less than 0.05%, it is difficult to realize an effect of controlling strength and in the case where the Mo content is more than 1.00%, there is an increase in cost.

In the case where the Cu content is less than 0.05%, it is difficult to realize an effect of promoting the formation of a retained γ phase and in the case where the Cu content is more than 1.00%, there is an increase in cost.

In the case where the Ni content is less than 0.05%, it is difficult to realize an effect of promoting the formation of a retained γ phase and in the case where the Ni content is more than 1.00%, there is an increase in cost.

It is needless to say that it is not necessary to add these chemical elements in the case where it is considered to be unnecessary to add these chemical elements in order to improve mechanical properties.

The remainder of the chemical composition other than the chemical elements described above consists of Fe and inevitable impurities.

As a method for achieving the coated layer according to the present invention, there is one in which internal oxides of, for example, Si and Mn are formed at the grain boundaries in the surface layer of a steel sheet and the grain boundaries are corroded using an acid solution such as hydrochloric acid before a galvanization treatment is performed. In the case where internal oxides are formed at the grain boundaries in the surface layer of the steel sheet, an Fe—Zn alloying reaction preferentially occurs at the grain boundaries in the subsequent alloying treatment process, which results in the realization of the state in which the grains of the base steel sheet are taken into the coated layer. Examples of a method for forming internal oxides of, for example, Si and Mn at the grain boundaries in the surface layer of a steel sheet include one in which a hot-rolled steel is coiled at a high temperature, one in which an iron oxide layer is formed on the surface layer of a steel sheet by oxidizing the steel sheet in advance and reduction annealing is performed on the oxidized steel sheet before a galvanization treatment is performed, and one in which a dew point in an atmosphere is controlled in an annealing process before a galvanization treatment is performed.

In the case where a hot-rolled steel sheet is coiled at a high temperature, since oxidized scale which is formed on the surface of the steel sheet in a hot rolling process becomes the supply source of oxygen, it is possible to form the internal oxides of Si and Mn in the surface layer of the steel sheet in a cooling process after coiling has been performed. Since an oxidation reaction is promoted to a higher degree at a higher temperature, it is preferable that coiling be performed at a temperature of 600° C. or higher.

In the case where an iron oxide layer is formed in the surface layer by oxidizing a steel sheet in advance and reduction annealing is performed on the oxidized steel sheet before a galvanization treatment is performed, since the iron oxide layer which is formed in the surface layer becomes the supply source of oxygen, it is possible to form the internal oxides of Si and Mn in the surface layer of the steel sheet in the reduction annealing process. In order to increase the amount of the supply resource of oxygen, since it is necessary to form a sufficient amount of iron oxides in advance, it is preferable that the steel sheet be oxidized at a temperature of 700° C. or higher in an oxidizing atmosphere in advance.

In the case where a dew point in an atmosphere is controlled in an annealing process before a galvanization treatment is performed, it is possible to form the internal oxides of Si and Mn in the surface layer of the steel sheet in the annealing process by controlling oxygen potential in the atmosphere to be high. Since it is possible to control oxygen potential to be high by controlling a dew point to be high, it is preferable that the dew point be controlled to be −20° C. or higher.

By forming the internal oxides of Si and Mn in the surface layer of a steel sheet using the methods described above, and by further corroding the grain boundaries using an acid solution such as hydrochloric acid before a galvanization treatment is performed, an Fe—Zn alloying reaction starting at the grain boundaries is preferentially promoted. As a result, it is possible to realize the state in which the grains of the base steel sheet are taken into the coated layer.

Example 1

The present invention will be described with reference to examples hereafter. Cold-rolled steel sheets having the chemical compositions given in Table 1 were used as samples. After an oxidation treatment had been performed in which iron oxides are formed on the surfaces of the steel sheets by heating the steel sheets in an oxidizing atmosphere in advance, reduction annealing was performed. Then a pickling treatment was performed, and, further, a galvanization treatment and an alloying treatment were performed.

TABLE 1

| Steel Code | C | Si | Mn | Cr | P | S |
|---|---|---|---|---|---|---|
| | | | | | | (mass %) |
| A | 0.09 | 0.2 | 2.0 | 0.06 | 0.010 | 0.001 |
| B | 0.05 | 0.6 | 1.5 | 0.02 | 0.010 | 0.001 |
| C | 0.06 | 1.0 | 2.2 | 0.03 | 0.010 | 0.001 |
| D | 0.08 | 1.5 | 1.4 | 0.02 | 0.010 | 0.001 |
| E | 0.11 | 1.5 | 2.7 | 0.02 | 0.010 | 0.001 |

In the oxidation treatment, direct fire burners were used under conditions such that the air-fuel ratio was 1 or more in order to provide an oxidation condition and that a maximum end-point temperature (oxidation temperature) was changed by controlling the output power of the direct fire burners, and cooling by nitrogen gas was performed without a holding time once a sample temperature reached the maximum end-point temperature. Subsequently, the reduction annealing was performed using an infrared heating furnace in an atmosphere (having a dew point of −35° C.) containing 10 vol % of hydrogen and the balance being nitrogen under conditions such that the steel sheet temperature was 820° C. and the holding time was 30 seconds. Galvanization was performed using a galvanizing bath of 460° C. containing 0.14 mass % of Al (Fe saturation) under conditions such that the temperature of a steel sheet at the entrance was 460° C. and the dipping time was 1 second. Coating weight was controlled using a nitrogen gas wiper after galvanization had been performed. Some of the steel sheets were subjected to cooling by nitrogen gas after reduction annealing had been performed and subsequently to a pickling treatment in which the steel sheets were dipped in hydrochloric acid containing inhibitor for 20 seconds, and then galvanization was performed. The obtained galvanized steel sheets were subjected to an alloying treatment using an induction heating furnace under conditions that the heating temperature was 500° C. to 600° C. and the treatment time was 15 seconds. The coating weight was determined by a difference between weights before and after the coated layer was dissolved by hydrochloric acid containing inhibitor. Moreover, using ICP spectroscopy, by determining the amount of Fe in the hydrochloric acid in which the coated layer was dissolved, Fe content in the coated layer was determined. Methods for determining the cross section area ratio of grains of a base steel sheet taken into a coated layer and for evaluating anti-powdering property will be described below.

<Method for Determining the Cross Section Area Ratio of the Grains of a Base Steel Sheet Taken into a Coated Layer>

A specimen was prepared by embedding the galvannealed steel sheet obtained by the above-described method in epoxy resin and subsequently polishing the embedded steel sheet, and the backscattered electron image of the cross section of a coated layer was observed using a SEM. Since contrast varies depending on atomic number in a backscattered electron image as described above, it is possible to distinguish between the coated layer and grains of the base steel sheet. Moreover, using image processing, by respectively determining the area of the whole coated layer and the area of the grains of the base steel sheet taken into the coated layer, the cross section area ratio of the grains of the base steel sheet taken into the coated layer was derived.

<Method for Evaluating Anti-Powdering Property>

By bending the galvannealed steel sheet obtained as described above at an angle of 60°, and by sticking cellophane tape having a width of 24 mm to the surface of the steel sheet on the inside of the part subjected to bending deformation (compressively deformed side) in parallel with the bent part and then separating the tape, the amount of Zn stuck to the cellophane tape having a length of 40 mm was determined by a Zn count number observed using fluorescent X-rays. On the basis of the standard below, anti-powdering property was evaluated. A case corresponding to mark 3 or more was evaluated as satisfactory.

Fluorescent X-Rays Zn Count Number and Mark
0 or more and less than 1500: 5 (good)
1500 or more and less than 3000: 4
3000 or more and less than 4000: 3
4000 or more and less than 5000: 2
5000 or more: 1 (poor)

The manufacturing conditions and the obtained results are given in Table 2.

TABLE 2

| No. | Steel Grade | Oxidation Temperature (° C.) | Execution of Pickling | Coating Weight (g/m$^2$) | Fe Content in Coated Layer (mass %) | Cross Section Area Ratio of Grains of Base Steel Sheet in Coated Layer (%) | Anti-Powdering Property Mark | Note |
|---|---|---|---|---|---|---|---|---|
| 1 | A | 700 | ○ | 50.2 | 10.3 | — | 1 | Comparative Example |
| 2 | A | 800 | ○ | 48.5 | 9.8 | — | 2 | Comparative Example |
| 3 | B | 600 | ○ | 45.7 | 9.6 | — | 2 | Comparative Example |
| 4 | B | 700 | X | 44.2 | 8.9 | — | 2 | Comparative Example |
| 5 | B | 700 | ○ | 51.3 | 13.5 | 4.8 | 4 | Example |
| 6 | B | 800 | X | 50.3 | 10.6 | 0.8 | 2 | Comparative Example |
| 7 | B | 800 | ○ | 47.9 | 16.8 | 7.9 | 5 | Example |
| 8 | C | 600 | ○ | 55.5 | 12.8 | 4.1 | 4 | Example |
| 9 | C | 600 | X | 51.7 | 10.4 | — | 1 | Comparative Example |
| 10 | C | 700 | ○ | 55.3 | 15.4 | 3.8 | 4 | Example |
| 11 | D | 750 | ○ | 60.3 | 15.3 | 4.5 | 4 | Example |
| 12 | E | 600 | ○ | 50.6 | 9.1 | — | 1 | Comparative Example |
| 13 | E | 700 | ○ | 55.1 | 12.3 | 2.6 | 4 | Example |
| 14 | E | 750 | ○ | 49.7 | 14.5 | 7.1 | 5 | Example |
| 15 | E | 750 | ○ | 75.4 | 13.8 | 6.8 | 4 | Example |
| 16 | E | 750 | ○ | 104.7 | 15.1 | 6.9 | 4 | Example |
| 17 | E | 750 | ○ | 135.4 | 12.4 | 6.1 | 3 | Example |
| 18 | E | 800 | ○ | 49.7 | 18.6 | 12.5 | 5 | Example |

—: no grain of a base steel sheet was obseved in a coated layer

As indicated in Table 2, it is clarified that galvannealed steel sheets having coated layers according to the present invention were good in terms of anti-powdering property. On the other hand, galvannealed steel sheets out of the preferred range according to the present invention were poor in terms of anti-powdering property.

A galvannealed steel sheet according to the present invention can be used as a galvannealed steel sheet with excellent anti-powdering property.

The invention claimed is:

1. A galvannealed steel sheet with excellent anti-powdering property, the steel sheet having a coated layer taking in grains of a base steel sheet such that the grains constitute 2.0% or more and 15.0% or less of the coated layer in terms of cross section area ratio.

2. The galvannealed steel sheet with excellent anti-powdering property according to claim 1, wherein the coated layer has an Fe content of 10 mass % or more and 20 mass % or less.

3. The galvannealed steel sheet with excellent anti-powdering property according to claim 1, wherein the coated layer has a coating weight per side of 20 g/m$^2$ or more and 120 g/m$^2$ or less.

4. The galvannealed steel sheet with excellent anti-powdering property according to claim 1, wherein the steel sheet has a chemical composition containing C: 0.030 mass % or more and 0.200 mass % or less, Si: 0.5 mass % or more and 2.0% mass % or less, Mn: 1.0 mass % or more and 3.0 mass % or less, P: 0.025 mass % or less, S: 0.010 mass % or less, and the balance being Fe and inevitable impurities.

5. The galvannealed steel sheet with excellent anti-powdering property according to claim 2, wherein the coated layer has a coating weight per side of 20 g/m$^2$ or more and 120 g/m$^2$ or less.

6. The galvannealed steel sheet with excellent anti-powdering property according to claim 2, wherein the steel sheet has a chemical composition containing C: 0.030 mass % or more and 0.200 mass % or less, Si: 0.5 mass % or more and 2.0% mass % or less, Mn: 1.0 mass % or more and 3.0 mass % or less, P: 0.025 mass % or less, S: 0.010 mass % or less, and the balance being Fe and inevitable impurities.

7. The galvannealed steel sheet with excellent anti-powdering property according to claim 3, wherein the steel sheet has a chemical composition containing C: 0.030 mass % or more and 0.20 mass % or less, Si: 0.5 mass % or more and 2.0% mass % or less, Mn: 1.0 mass % or more and 3.0 mass % or less, P: 0.025 mass % or less, S: 0.010 mass % or less, and the balance being Fe and inevitable impurities.

* * * * *